United States Patent
Davis et al.

(10) Patent No.: US 11,932,290 B2
(45) Date of Patent: *Mar. 19, 2024

(54) SYSTEMS AND METHODS FOR AUDITING ASSETS

(71) Applicant: BNSF Railway Company, Fort Worth, TX (US)

(72) Inventors: Philip Gerald Davis, Fort Worth, TX (US); Ross Aaron Springer, Fort Worth, TX (US); Devin Scott Wagner, Haltom City, TX (US); Jacob Scott Ford, Billings, MT (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/816,580

(22) Filed: Aug. 1, 2022

(65) Prior Publication Data
US 2022/0363296 A1 Nov. 17, 2022

Related U.S. Application Data

(63) Continuation of application No. 16/654,682, filed on Oct. 16, 2019, now Pat. No. 11,427,232.

(51) Int. Cl.
*G01S 7/48* (2006.01)
*B61K 9/08* (2006.01)
(Continued)

(52) U.S. Cl.
CPC ............... *B61K 9/08* (2013.01); *B61L 25/06* (2013.01); *G01S 7/4808* (2013.01); *G01S 17/89* (2013.01); *G06Q 50/30* (2013.01)

(58) Field of Classification Search
CPC ... G06T 2207/30252; G06T 2207/0044; G06T 7/0044; G06K 9/4604; G06K 9/00791;
(Continued)

(56) References Cited

U.S. PATENT DOCUMENTS

2018/0061055 A1    3/2018  Owechko
2018/0307915 A1*  10/2018  Olson ................. G05D 1/0231

FOREIGN PATENT DOCUMENTS

EP            3138754 A1    3/2017
JP         2017041070 A     2/2017
(Continued)

OTHER PUBLICATIONS

Patent Cooperation Treaty, International Search Report and Written Opinion, InternationAppliation No. PCT/US2020/050629, dated Dec. 18, 2020, 10 pages.

*Primary Examiner* — Phuoc H Doan
(74) *Attorney, Agent, or Firm* — Whitaker Chalk Swindle & Schwartz, PLLC; Enrique Sanchez, Jr.; Bradley J. Birchfield

(57) ABSTRACT

In one embodiment, a method includes receiving first Light Detection and Ranging (LiDAR) data associated with a railroad environment, extracting an asset from the first LiDAR data associated with the railroad environment, and superimposing the asset into a spatial model. The method also includes receiving a field indication associated with a modification to the railroad environment and modifying the spatial model in response to receiving the field indication associated with the modification to the railroad environment. The method further includes receiving second LiDAR data associated with the railroad environment and comparing the second LiDAR data to the modified spatial model.

18 Claims, 5 Drawing Sheets

(51) Int. Cl.
  *B61L 25/06*     (2006.01)
  *G01S 17/89*     (2020.01)
  *G06Q 50/30*     (2012.01)

(58) Field of Classification Search
  CPC .. G06K 9/6267; G06K 9/6251; G05D 1/0248;
                                      G05D 1/0251
  See application file for complete search history.

(56) References Cited

FOREIGN PATENT DOCUMENTS

| | | |
|---|---|---|
| JP | 2018508418 A | 3/2018 |
| WO | 2016118672 A2 | 7/2016 |

\* cited by examiner

| Assets 154 | Total | Pass | Exception | Percentage Pass | Exceptions Found with no CMP | Exceptions Found with Incorrect CMP | CMP Found but no GIS Edit | Exceptions Found (Office Error) | Could not Verify |
|---|---|---|---|---|---|---|---|---|---|
| Clearence Point | 117 | 117 | 0 | 100.0% | 0 | 0 | 0 | 0 | 0 |
| Crossing | 269 | 269 | 0 | 100.0% | 0 | 0 | 0 | 0 | 0 |
| Milepost Sign | 207 | 203 | 4 | 98.1% | 3 | 1 | 0 | 0 | 0 |
| Signal | 199 | 199 | 0 | 100.0% | 0 | 0 | 0 | 0 | 0 |
| Speed Sign | 98 | 92 | 6 | 93.9% | 2 | 4 | 0 | 0 | 0 |
| Switch | 84 | 81 | 3 | 96.4% | 2 | 1 | 0 | 0 | 0 |
| Total | 974 | 961 | 13 | 98.7% | 7 | 6 | 0 | 0 | 0 |

*FIG. 4*

SYSTEMS AND METHODS FOR AUDITING ASSETS

CROSS-REFERENCE TO RELATED APPLICATIONS

The present application is a Continuation Application of U.S. patent application Ser. No. 16/654,682, filed Oct. 16, 2019, the contents of which is incorporated herein in its entirety for all purposes.

SYSTEMS AND METHODS FOR AUDITING ASSETS

Technical Field

This disclosure generally relates to auditing assets, and more specifically to systems and methods for auditing assets.

BACKGROUND

Positive train control (PTC) is a communications-based train control system used to prevent accidents involving trains. PTC improves the safety of railway traffic by auditing railroad track data. However, the track data used by the PTC system may misrepresent the actual location of assets associated with the railroad, which may negatively affect the performance of the PTC system.

SUMMARY

According to an embodiment, a method includes receiving first Light Detection and Ranging (LiDAR) data associated with a railroad environment, extracting an asset from the first LiDAR data associated with the railroad environment, and superimposing the asset into a spatial model. The method also includes receiving a field indication associated with a modification to the railroad environment and modifying the spatial model in response to receiving the field indication associated with the modification to the railroad environment. The method further includes receiving second LiDAR data associated with the railroad environment and comparing the second LiDAR data to the modified spatial model.

According to another embodiment, a system includes one or more processors and a memory storing instructions that, when executed by the one or more processors, cause the one or more processors to perform operations including receiving first LiDAR data associated with a railroad environment, extracting an asset from the first LiDAR data associated with the railroad environment, and superimposing the asset into a spatial model. The operations also include receiving a field indication associated with a modification to the railroad environment and modifying the spatial model in response to receiving the field indication associated with the modification to the railroad environment. The operations further include receiving second LiDAR data associated with the railroad environment and comparing the second LiDAR data to the modified spatial model.

According to yet another embodiment, one or more computer-readable storage media embody instructions that, when executed by a processor, cause the processor to perform operations including receiving first LiDAR data associated with a railroad environment, extracting an asset from the first LiDAR data associated with the railroad environment, and superimposing the asset into a spatial model. The operations also include receiving a field indication associated with a modification to the railroad environment and modifying the spatial model in response to receiving the field indication associated with the modification to the railroad environment. The operations further include receiving second LiDAR data associated with the railroad environment and comparing the second LiDAR data to the modified spatial model.

Technical advantages of certain embodiments of this disclosure may include one or more of the following. Certain systems and methods described herein identify and validate PTC critical assets without manual measurements on or near the railroad, which improves the safety and efficiency of identifying and validating assets. Certain systems and methods described herein leverage LiDAR to identify and validate PTC critical assets, which improves the accuracy of identifying and validating assets.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which:

FIG. 4 illustrates example output generated by an auditing module; and

DETAILED DESCRIPTION

Certain embodiments of this disclosure include systems and methods for auditing assets by comparing data (e.g., LiDAR data and field data) captured at different times. The assets may be PTC critical assets associated with a railroad environment that are audited for PTC compliance.

Figure 1:
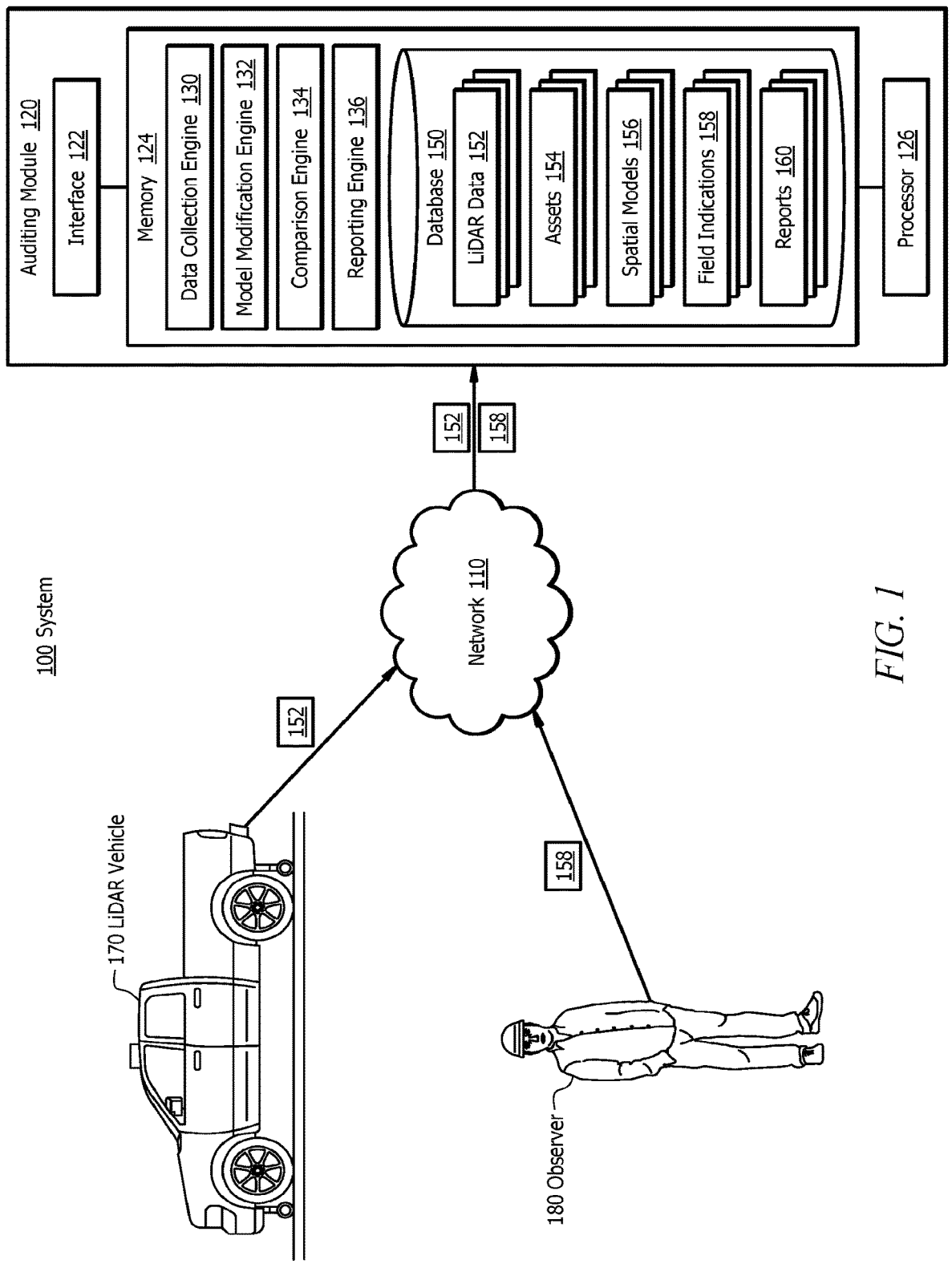
FIG. 1 illustrates an example system for auditing assets.
Figure 2:
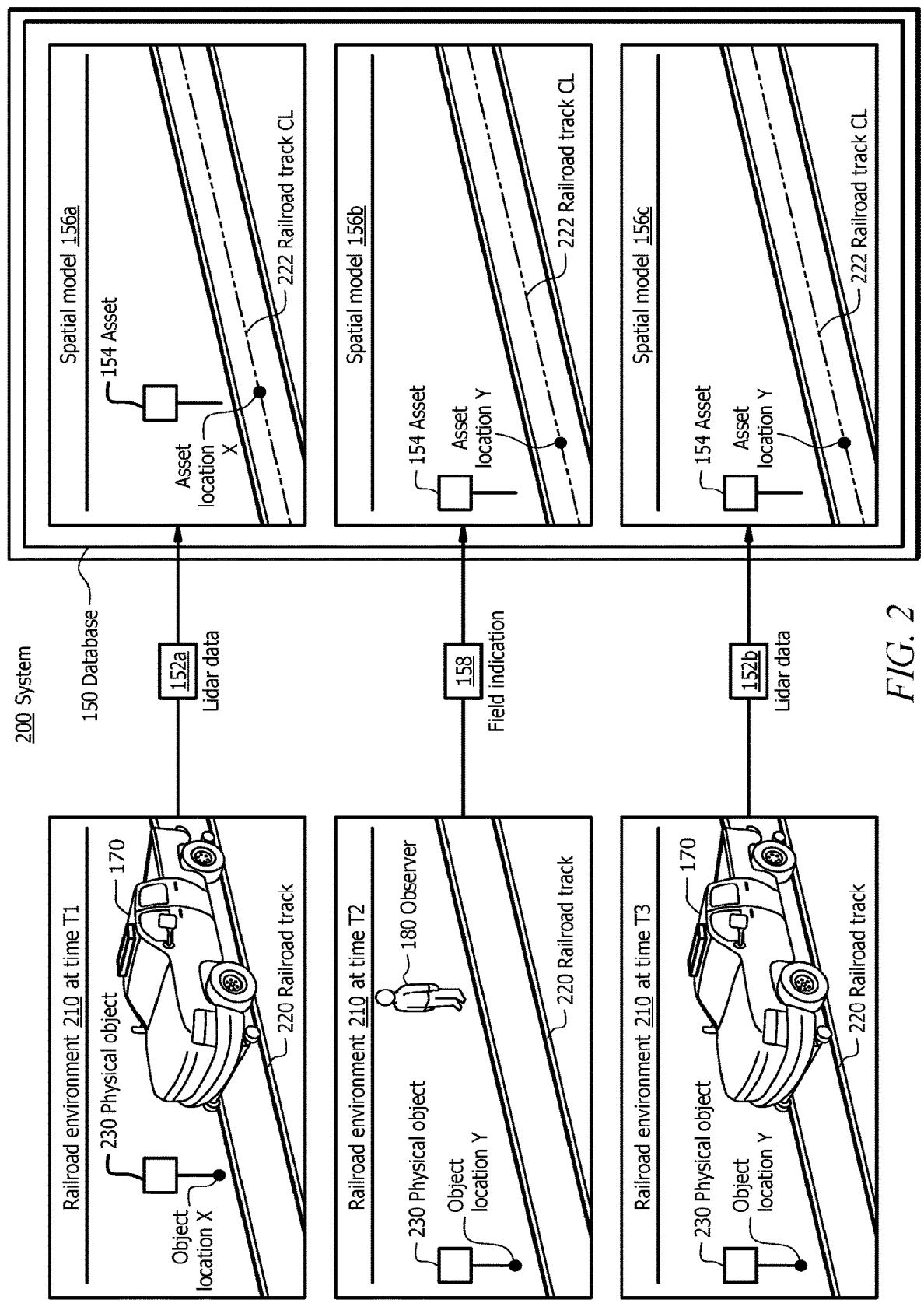
FIG. 2 illustrates another example system for auditing assets.
Figure 3:
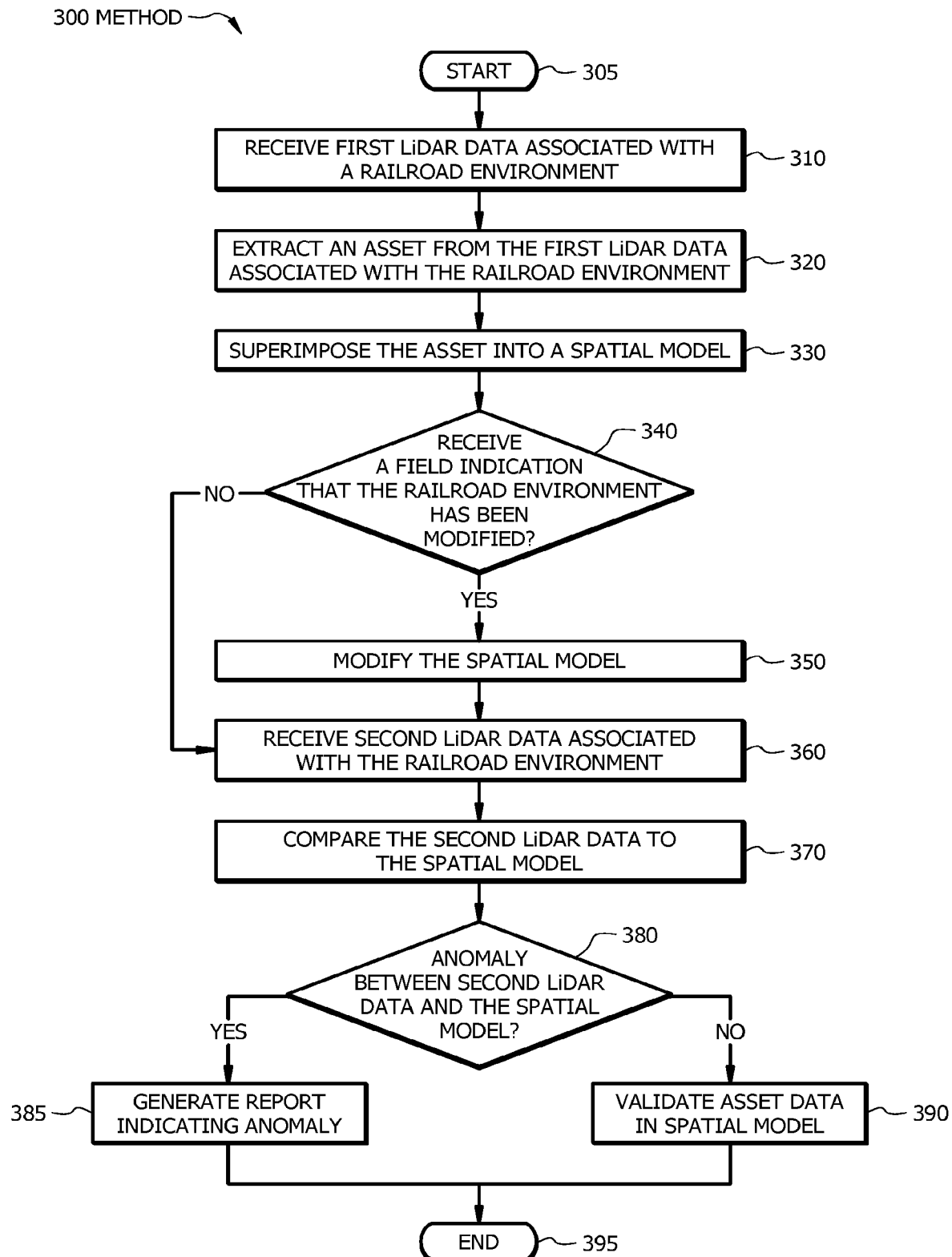
FIG. 3 illustrates an example method for auditing assets.
Figure 5:
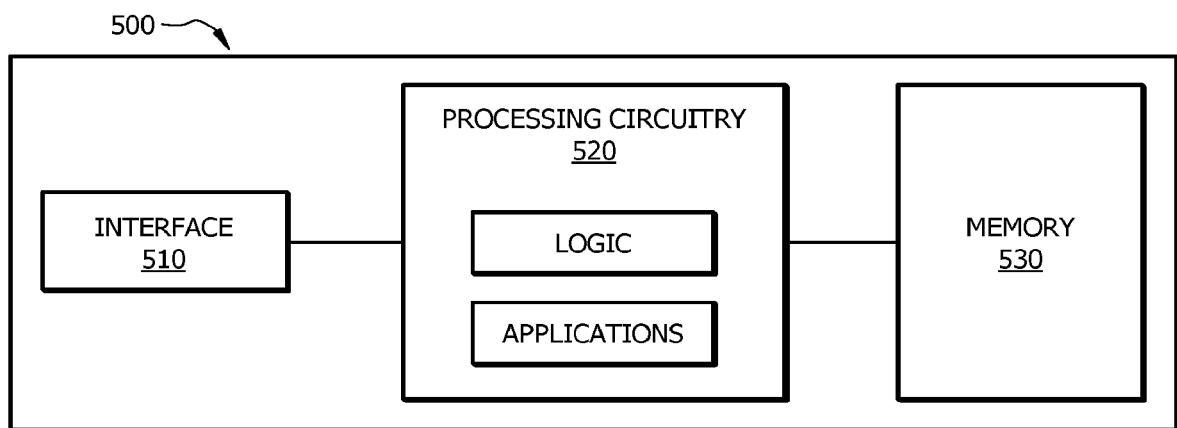
FIG. 5 illustrates an example computer system that may be used by the systems and methods described herein.

FIGS. 1 through 5 show example systems and methods for auditing assets. FIG. 1 shows an example system for auditing assets and FIG. 2 shows another example system for auditing assets. FIG. 3 shows an example method for auditing assets. FIG. 4 shows example output generated by an auditing module. FIG. 5 shows an example computer system that may be used by the systems and methods described herein.

FIG. 1 illustrates an example system 100 for auditing assets. System 100 of FIG. 1 includes a network 110, an auditing module 120, a LiDAR vehicle 170, and an observer 180. System 100 or portions thereof may be associated with an entity, which may include any entity, such as a business, company (e.g., a railway company, a transportation company, etc.), or a government agency (e.g., a department of transportation, a department of public safety, etc.) that may audit assets. The elements of system 100 may be implemented using any suitable combination of hardware, firmware, and software.

Network 110 of system 100 may be any type of network that facilitates communication between components of system 100. Network 110 may connect auditing module 120 to LiDAR vehicle 170 of system 100. Although this disclosure shows network 110 as being a particular kind of network, this disclosure contemplates any suitable network. One or more portions of network 110 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a 3G network, a 4G network, a 5G network, a Long Term Evolution (LTE) cellular network, a combination of two or more of these, or other suitable types of networks. One or more portions of network 110 may include one or more access (e.g., mobile access), core, and/or edge networks. Network 110 may be any communications network, such as a private network, a public network, a connection through Internet, a mobile network, a WI-FI network, a Bluetooth network, etc. Network 110 may include cloud computing capabilities. One or more components of system 100 may communicate over network 110. For example, auditing module 120 may communicate over network 110, including receiving information from LiDAR vehicle 170.

Auditing module 120 of system 100 represents any suitable computing component that may be used to audit assets 154. Auditing module 120 may be communicatively coupled to LiDAR vehicle 170 via network 110. Auditing module 120 includes an interface 122, a memory 124, and a processor 126.

Interface 122 of auditing module 120 represents any suitable computer element that can receive information from network 110, transmit information through network 110, perform suitable processing of the information, communicate to other components (e.g., LiDAR vehicle 170) of system 100 of FIG. 1, or any combination of the preceding. Interface 122 represents any port or connection, real or virtual, including any suitable combination of hardware, firmware, and software, including protocol conversion and data processing capabilities, to communicate through a LAN, a WAN, or other communication system that allows system 100 of FIG. 1 to exchange information between components of system 100.

Memory 124 of auditing module 120 stores, permanently and/or temporarily, received and transmitted information, as well as system software, control software, other software for auditing module 120, and a variety of other information. Memory 124 may store information for execution by processor 126. Memory 124 includes any one or a combination of volatile or non-volatile local or remote devices suitable for storing information. Memory 124 may include Random Access Memory (RAM), Read-only Memory (ROM), magnetic storage devices, optical storage devices, or any other suitable information storage device or a combination of these devices. Memory 124 may include any suitable information for use in the operation of auditing module 120. Additionally, memory 124 may be a component external to (or may be partially external to) auditing module 120. Memory 124 may be located at any location suitable for memory 124 to communicate with auditing module 120. In the illustrated embodiment of FIG. 1, memory 124 of auditing module 120 stores a data collection engine 130, a model modification engine 132, a comparison engine 134, a reporting engine 136, and a database 150. In certain embodiments, data collection engine 130, model modification engine 132, comparison engine 134, reporting engine 136, and/or database 150 may be external to memory 124 and/or auditing module 120.

Data collection engine 130 of auditing module 120 is an application that collects data from one or more components of system 100. Data collection engine 130 may collect data from LiDAR vehicle 170. For example, data collection engine 130 may collect LiDAR data 152 (e.g., digital images) and/or GPS data from one or more components of LiDAR vehicle 170 via network 110. Data collection engine 130 may collect data from observer 180. For example, data collection engine 130 may collect one or more field indications 158 from a user device (e.g., a smartphone, a tablet, a laptop computer, etc.) associated with observer 180.

Data collection engine 130 may utilize one or more programs to generate a spatial model 156. For example, data collection engine 130 may use a geographic information system (GIS) and/or LiDAR visualization software to generate spatial model 156. GIS integrates different types of data. For example, GIS may analyze spatial locations and organize layers of information into spatial model 156 using maps, two dimensional (2D) scenes, and/or three dimensional (3D) scenes. The 2D scenes may include orthographic imagery generated from LiDAR point cloud data. LiDAR visualization software may be used by data collection engine 130 to read and interpret LiDAR data 152. Data collection engine 130 may generate spatial model 156 using LiDAR data 152, GPS data, one or more field indications 158, one or more images (e.g., a LiDAR image), one or more point clouds, any other suitable data, or any suitable combination of the preceding. Data collection engine 130 may extract one or more assets 154 from LiDAR data 152. Data collection engine 130 may superimpose asset 154 into spatial model 156.

Data collection engine 130 may use machine learning to intelligently and automatically identify assets 154. In certain embodiments, data collection engine 130 may use machine learning to extract assets 154 from LiDAR data 152. One or more machine learning algorithms may identify assets 154 and compare assets 154 to a database to audit the presence, location, and/or other characteristics of assets 154 within the environment captured by LiDAR data 152.

Model modification engine 132 of auditing module 120 is an application that modifies spatial model 156. Model modification engine 132 may modify spatial model 156 in response to one or more conditions. For example, model modification engine 132 may model spatial model 156 in response to receiving field indication 158 that an environment captured by LiDAR data 152 will be or has been modified. Field indication 158 may represent that asset 154 will be or has been physically moved from a first location to a second location within the environment captured by LiDAR data 152. Field indication 158 may represent that asset 154 will be or has been physically removed from the environment captured by LiDAR data 152. Field indication 158 may represent that asset 154 will be or has been added to the environment captured by LiDAR data 152.

Comparison engine 134 of auditing module 120 is an application that compares data. For example, spatial models 156 may include spatial models 156a-n (where n represents any suitable integer), and comparison engine 134 may compare data within first spatial model 156a generated at time T1 to data within second spatial model 156b generated at time T2, where time T2 is any time after time T1. Comparison engine 134 may determine, based on the comparison of two or more spatial models 156, whether an anomaly exists between two or more spatial models 156. For example, comparison engine 134 may determine that a location of asset 154 within first spatial model 156a is different than a location of asset 154 within second spatial model 156b. As another example, comparison engine 134 may determine that asset 154 within first spatial model 156a is not present within second spatial model 156b.

Comparison engine 134 may verify, based on the comparison of two or more spatial models 156, that the information within the compared two or more spatial models 156 is the same. For example, comparison engine 134 may confirm that the location of asset 154 within first spatial model 156a matches the location of asset 154 within second spatial model 156b. Confirmation by comparison engine 134 that the location of asset 154 within first spatial model 156a matches the location of asset 154 within second spatial model 156b may be based on a predetermined tolerance. For example, comparison engine 134 may confirm that the location within first spatial model 156a matches the location of asset 154 within second spatial model 156b in the event the locations are determined to be within 2.2 meters of each other.

Reporting engine 136 of auditing module 120 is an application that generates one or more reports 160. Reporting engine 136 may generate report 160 in response to comparison engine 134 making one or more determinations. For example, reporting engine 136 may generate report 160 in response to comparison engine 134 determining that an anomaly exists between two or more spatial models 156. As another example, reporting engine 136 may generate report 160 in response to comparison engine 134 determining that the information between two or more data sets (e.g., two or more spatial models 156) is the same.

Database 150 of auditing module 120 may store certain types of information for auditing module 120. For example, database 150 may store LiDAR data 152, one or more assets 154, one or more spatial models 156, one or more field indications 158, and one or more reports 160. LiDAR data 152 is any data generated using LiDAR. LiDAR data 152 may include one or more digital images. In certain embodiments, a digital image of the LiDAR data 152 may be a 360 degree image that has a range of approximately 600 feet each side of a centerline of a railroad track within the railroad environment. In the illustrated embodiment of FIG. 1, LiDAR data 152 is communicated from LiDAR vehicle 170 to auditing module 120 of system 100 via network 110.

Assets 154 are data extracted from LiDAR data 152 that represent physical objects in an environment. For example, assets 154 may be images extracted from LiDAR data 152 that represent physical objects within a railroad environment. In certain embodiments, assets 154 may be PTC critical assets. PTC is a system of functional requirements for monitoring and controlling train movements. Each asset 154 may represent one or more of the following physical objects within the railroad environment: a train-controlled signal (e.g., a signal governing train movement), a switch point, a crossing at grade, a mile post sign, a speed sign, a clearance point, and the like.

Spatial models 156 are 2D and 3D models that represent one or more environments. Each spatial model 156 may include vector data and/or raster data. Vector data of spatial model 156 may represent one or more assets 154 as discrete points, lines, and/or polygons. Raster data of spatial model 156 may represent one or more assets 154 as a rectangular matrix of square cells. Spatial models 156 may be stored in a GIS database. One or more spatial models 156 may include LiDAR vector data and/or LiDAR raster data. One or more spatial models 156 may include LiDAR point cloud data. The LiDAR point cloud data may be converted to a vector and/or raster format. One or more spatial models 156 may include one or more assets 154. Each asset 154 has a location within spatial model 156. Each asset 154 within spatial model 156 may include one or more attributes. Asset attributes specify a characteristic (e.g., a quality, aspect, version, etc.) that can be applied to asset 154.

Field indications 158 are indications of changes to physical objects within an environment. Field indications 158 may include indications of anticipatory changes to physical objects within the environment. Field indication 158 may indicate that asset 154 will change location or has changed location within an environment captured by LiDAR data 152. For example, field indication 158 may indicate that a speed sign is scheduled to move 20 feet within a railroad environment. As another example, field indication 158 may indicate that a speed sign has moved 20 feet within a railroad environment. Field indication 158 may indicate that asset 154 will be or has been removed from the environment captured by LiDAR data 152. For example, field indication 158 may indicate that a crossing at grade is scheduled to be removed from the railroad environment. As another example, field indication 158 may indicate that a crossing at grade has been removed from the railroad environment. Field indication 158 may indicate that asset 154 will be or has been added to the environment captured by LiDAR data 152. For example, field indication 158 may indicate that a mile post sign is scheduled to be added to a railroad environment. As another example, field indication 158 may indicate that a mile post sign has been added to a railroad environment.

Reports 160 are communications generated in response to determinations made by auditing module 120 (e.g., comparison engine 134). One or more reports 160 may be verbal and/or written communications. One or more reports 160 may be generated electronically by a machine and/or physically by a human being. Report 160 may include information indicating an anomaly exists between two or more spatial models 156. Report 160 may include information verifying that the information between two or more spatial models 156 is the same. Report 160 may include lists, charts, tables, diagrams, and the like. For example, report 160 may include table 410 of FIG. 4, which illustrates example auditing results generated by auditing module 120.

Database 150 may be any one or a combination of volatile or non-volatile local or remote devices suitable for storing information. Database 150 may include RAM, ROM, magnetic storage devices, optical storage devices, or any other suitable information storage device or a combination of these devices. Database 150 may be a component external to auditing module 120. Database 150 may be located in any location suitable for database 150 to store information for auditing module 120. For example, database 150 may be located in a cloud environment.

Processor 126 of auditing module 120 controls certain operations of auditing module 120 by processing information received from interface 122 and memory 124 or otherwise accessed by processor 126. Processor 126 communicatively couples to interface 122 and memory 124. Processor 126 may include any hardware and/or software that operates to control and process information. Processor 126 may be a programmable logic device, a microcontroller, a microprocessor, any suitable processing device, or any suitable combination of the preceding. Additionally, processor 126 may be a component external to auditing module 120. Processor 126 may be located in any location suitable for processor 126 to communicate with auditing module 120. Processor 126 of auditing module 120 controls the operations of data collection engine 130, model modification engine 132, comparison engine 134, and reporting engine 136.

LiDAR vehicle 170 of system 100 represents a vehicle (e.g., a van, a truck, a car, a rail car, etc.) that collects LiDAR data 152 (e.g., digital images). LiDAR vehicle 170 may include one or more scanning and/or imaging sensors. The sensors may create one or more images (e.g., a 3D point cloud) that facilitate auditing module 120 in detecting assets 154. LiDAR vehicle 170 may collect GPS data. The LiDAR and GPS data may be used to generate a 360-degree real world view of a railroad environment. In certain embodiments, LiDAR vehicle communicates data (e.g., LiDAR data 152 and/or GPS data) to auditing module 120.

Observer 180 of system 100 is any human or machine that observes the environment captured by LiDAR data 152. Observer 180 may be an inspector (e.g., a railroad inspector), an engineer (e.g., a rail field engineer or a safety engineer), a passer-by (e.g., a pedestrian, a driver, etc.), a law enforcement agent (e.g., a police officer), a camera (e.g., a video camera), and the like. Observer 180 may communicate information (e.g., field indication 158) to auditing module 120 via a web application (e.g., a work order application), a phone call, a text message, an email, a report, and the like. Observer 180 may communicate information to auditing module 120 using a phone (e.g., a smartphone), a tablet, a laptop computer, or any other suitable device.

Although FIG. 1 illustrates a particular arrangement of network 110, auditing module 120, interface 122, memory 124, processor 126, data collection engine 130, model modification engine 132, comparison engine 134, reporting engine 136, database 150, LiDAR data 152, assets 154, spatial models 156, field indications 158, reports 160, LiDAR vehicle 170, and observer 180, this disclosure contemplates any suitable arrangement of network 110, auditing module 120, interface 122, memory 124, processor 126, data collection engine 130, model modification engine 132, comparison engine 134, reporting engine 136, database 150, LiDAR data 152, assets 154, spatial models 156, field indications 158, reports 160, LiDAR vehicle 170, and observer 180. Network 110, auditing module 120, interface 122, memory 124, processor 126, data collection engine 130, model modification engine 132, comparison engine 134, reporting engine 136, database 150, and LiDAR vehicle 170 may be physically or logically co-located with each other in whole or in part.

Although FIG. 1 illustrates a particular number of networks 110, auditing modules 120, interfaces 122, memories 124, processors 126, data collection engines 130, model modification engine 132, comparison engine 134, reporting engine 136, database 150, LiDAR data 152, assets 154, spatial models 156, field indications 158, reports 160, LiDAR vehicles 170, and observers 180, this disclosure contemplates any suitable number of networks 110, auditing modules 120, interfaces 122, memories 124, processors 126, data collection engines 130, model modification engine 132, comparison engine 134, reporting engine 136, database 150, LiDAR data 152, assets 154, spatial models 156, field indications 158, reports 160, LiDAR vehicles 170, and observers 180. One or more components of auditing module 120 and/or LiDAR vehicle 170 may be implemented using one or more components of the computer system of FIG. 5.

Although FIG. 1 describes system 100 for auditing assets 154, one or more components of system 100 may be applied to other implementations. For example, one or more components of auditing module 120 may be utilized for asset identification and/or inventory.

In operation, data collection engine 130 of auditing module 120 of system 100 receives LiDAR data 152 from LiDAR vehicle 170 at time T1 via network 110. LiDAR data 152 is associated with a railroad environment. Data collection engine 130 extracts asset 154 from LiDAR data 152 associated with the railroad environment and superimposes asset 154 on spatial model 156. Data collection engine 130 receives field indication 158 at time T2 from observer 180 (e.g., a rail field engineer) that the railroad environment will be or has been modified. Model modification engine 132 modifies spatial model 156 in response to receiving field indication 158 that the railroad environment will be or has been modified. Data collection engine 130 then receives LiDAR data 152 at time T3. LiDAR data 152 received at time T3 is associated with the railroad environment. Comparison engine 134 compares LiDAR data 152 received at time T3 to modified spatial model 156. Comparison engine 134 determines that the location of asset 154 within modified spatial model 146 is the same as the location of asset 154 within LiDAR data 152 received at time T3. Reporting engine 136 generates a report verifying that the location of asset 154 in modified spatial model 146 is accurate.

As such, system 100 of FIG. 1 validates assets 154 in spatial model 156 without manual measurements on or near the railroad, which improves the safety and efficiency of validating assets.

FIG. 2 illustrates an example system 200 for auditing assets that uses auditing module 120 of FIG. 1. System 200 of FIG. 2 includes a railroad environment 210 and auditing module 120. Railroad environment 210 is an area encompassing one or more railroad tracks 220. Railroad environment 210 may be associated with a division and/or a subdivision. The division is the portion of the railroad under the supervision of a superintendent. The subdivision is a smaller portion of the division. The subdivision may be a crew district and/or a branch line. In the illustrated embodiment of FIG. 2, railroad environment 210 includes physical object 230. Physical object 230 may be any tangible component within railroad environment 210, such as a train-controlled signal, a switch point, a crossing at grade, a mile post sign, a speed sign, a clearance point, and the like. In the illustrated embodiment of FIG. 2, physical object 230 is a sign.

System 200 of FIG. 2 includes an illustration of railroad environment 210 at three moments in time: T1, T2, and T3. At time T1 in the illustrated embodiment of FIG. 2, railroad environment 210 includes LiDAR vehicle 170. LiDAR vehicle 170 captures LiDAR data 152a at time T1. Time T1 represents the period of time required for LiDAR vehicle 170 to capture LiDAR data 152a. Time T1 may depend on the travel speed of LiDAR vehicle 170 as LiDAR vehicle 170 captures LiDAR data 152a. LiDAR data 152a indicates that physical object 230 is at physical object location X at time T1. In certain embodiments, LiDAR vehicle 170 communicates LiDAR data 152a to auditing module 120 of system 200.

Auditing module 120 of system 200 extracts asset 154 from LiDAR data 152a. Asset 154 represents physical object 230 of railroad environment 210 at time T1. Auditing module 120 then superimposes asset 154 on spatial model 156a such that spatial model 156a represents railroad environment 210 at time T1. In certain embodiments, auditing module 120 generates a railroad track centerline 222 in spatial model 156a. Auditing module 120 may extract one or more assets corresponding to railroad track 220 from LiDAR data 152a, superimpose the one or more assets corresponding to railroad track 220 on spatial model 156a, determine railroad track centerline 222 based on the assets corresponding to railroad track 220, and generate railroad track centerline 222 for spatial model 156a. In certain embodiments, railroad track centerline 222 is a line that is centered between the two outer rails of railroad track 220. Auditing module 120 may use railroad track centerline 222 as a reference line for the location of asset 154. In spatial model 156a, auditing module 120 translates the location of asset 154 from its actual location to a corresponding location along railroad track centerline 222, as shown by asset location X.

At time T2 in the illustrated embodiment of FIG. 2, railroad environment 210 includes observer 180. Observer 180 notices a modification in railroad environment 210 at time T2. Time T2 represents the period of time required for observer 180 to capture the modification in railroad environment 210. The modification may be a relocation of physical object 230 within railroad environment 210, the removal of physical object 230 from railroad environment 210, an addition of a second physical object 230 to railroad environment 210, and the like. Observer 180 may communicate field indication 158 that railroad environment 180 will be or has been modified to auditing module 120. In the illustrated embodiment of FIG. 2, field indication 158 represents an observation by observer 180 that physical object 230 has been physically moved from physical object location X to physical object location Y.

Auditing module 120 of system 200 receives field indication 158 from observer 180. For example, auditing module 120 of system 200 may receive field indication 158 from observer 180 via a web application (e.g., a work order application), email, phone call, text message, fax, report, etc. In response to receiving field indication 158, auditing module 120 modifies spatial model 156a to generate spatial model 156b. For example, a user (e.g., an administrator) may edit spatial model 156a to move asset 154 from asset location X to asset location Y, as illustrated in spatial model 156b. In spatial model 156b, auditing module 120 translates the location of asset 154 from its actual location to a corresponding location along railroad track centerline 222, as shown by asset location Y.

At time T3 in the illustrated embodiment of FIG. 2, LiDAR vehicle 170 captures LiDAR data 152b. Time T3 represents the period of time required for LiDAR vehicle 170 to capture LiDAR data 152b. Time T3 may depend on the travel speed of LiDAR vehicle 170 as LiDAR vehicle 170 captures LiDAR data 152b. LiDAR data 152b indicates that physical object 230 is at physical object location Y at time T3. In certain embodiments, LiDAR vehicle 170 communicates LiDAR data 152b to auditing module 120 of system 200.

Auditing module 120 of system 200 extracts asset 154 from LiDAR data 152b. Asset 154 represents physical object 230 of railroad environment 210 at time T3. Auditing module 120 then superimposes asset 154 on spatial model 156c such that spatial model 156c represents railroad environment 210 at time T3. In spatial model 156c, auditing module 120 translates the actual location of asset 154 to a corresponding location along railroad track centerline 222, as shown by asset location Y. Auditing module 120 may then compare spatial model 156c to spatial model 156b to verify that the changes to railroad environment 210 have been accurately captured.

Although FIG. 2 illustrates a particular arrangement of the components of system 200, this disclosure contemplates any suitable arrangement of the components of system 200. Although FIG. 2 illustrates a particular number of auditing modules 120, spatial models 156a, 156b, and 156c, assets 154, asset locations X and Y, LiDAR vehicles 170, time periods T1, T2, and T3, physical objects 230, physical object locations X and Y, railroad tracks 220, and railroad track centerlines 222, this disclosure contemplates any suitable number of auditing modules 120, spatial models 156a, 156b, and 156c, assets 154, asset locations X and Y, LiDAR vehicles 170, time periods T1, T2, and T3, physical objects 230, physical object locations X and Y, railroad tracks 220, and railroad track centerlines 222. For example, system 200 of FIG. 2 may include multiple physical objects 230a-n and multiple assets 154a-n, where n represents any suitable integer.

FIG. 3 shows an example method 300 for auditing assets. Method 300 begins at step 305. At step 310, an auditing module (e.g., auditing module 120 of FIG. 2) receives first LiDAR data (e.g., LiDAR data 152a of FIG. 2) associated with a railroad environment (e.g., railroad environment 210 of FIG. 2) from a LiDAR vehicle (e.g., LiDAR vehicle 170 of FIG. 2). The railroad environment includes a railroad track (e.g., railroad track 220 of FIG. 2). Method 300 then moves from step 310 to step 320. At step 320, the auditing module extracts an asset (e.g., asst 154 of FIG. 2) from the LiDAR data. The asset may represent a physical object (e.g., physical object 230 of FIG. 2), such as a train-controlled signal, a switch point, a crossing at grade, a mile post sign, a speed sign, a clearance point, etc. Method 300 then moves from step 320 to step 330.

At step 330, the auditing module superimposes the asset into a spatial model (e.g., spatial model 156a of FIG. 2). The location of the asset in the spatial model may be translated from its actual location to a location along a centerline of the railroad track in the railroad environment (e.g., railroad track centerline 222 of FIG. 2). Method 300 then moves from step 330 to step 340.

At step 340, the auditing module determines whether a field indication (e.g., field indication 158 of FIG. 2) has been received that indicates that the railroad environment will be or has been modified. For example, the auditing module may receive a field indication indicating that the physical object will be or has been moved within the railroad environment captured by the first LiDAR data, that the physical object will be or has been removed from the railroad environment captured by the first LiDAR data, or that a new physical object will be or has been added to the railroad environment captured by the first LiDAR data.

If the auditing module determines that a field indication has not been received that indicates that the railroad environment will be or has been modified, method 300 advances from step 340 to step 360. If the auditing module determines that a field indication has been received that indicates that the railroad environment will be or has been modified, method 300 moves from step 340 to step 350.

At step 350, the auditing module modifies the spatial model in accordance with the field indication. For example, the auditing module may move the location of the asset from location X along the centerline of the railroad track to location Y along the centerline of the railroad track. As another example, the auditing module may remove the asset from the spatial model. As still another example, the auditing module may add an asset to the spatial model. Modifying the spatial model results in a modified spatial model (e.g., spatial model 156b of FIG. 2.) Method 300 then moves from step 350 to step 360.

At step 360, the auditing module receives second LiDAR data (e.g., LiDAR data 152b of FIG. 2) associated with the railroad environment. The second LiDAR data is captured at a later time than the first LiDAR data. For example, the second LiDAR data may be captured by the LiDAR vehicle a month, a year, or five years after the first LiDAR data is captured by the LiDAR vehicle. Method 300 then moves from step 360 to step 370. At step 370, the auditing module compares the second LiDAR data to the spatial model. For example, the auditing module may compare a location of asset 154 in the modified spatial model to a location of asset 154 as indicated by the second LiDAR data. Method 300 then moves from step 370 to step 380.

At step 380, the auditing module determines whether an anomaly exists between the second LiDAR data and the spatial model. For example, the auditing module may determine that the location of the asset in the modified spatial model is different than the location of the asset in the second LiDAR data. If the auditing module determines that an anomaly exists between the second LiDAR data and the spatial model, method 300 moves from step 380 to step 385, where the auditing module generates a report indicating the anomaly. If the auditing module determines that an anomaly does not exist between the second LiDAR data and the spatial model, method 300 advances from step 380 to step 390, where the auditing module validates the asset data in the spatial model. Method 300 then moves to steps 385 and 390 to step 395, where method 300 ends.

Modifications, additions, or omissions may be made to method 300 depicted in FIG. 3. Method 300 may include more, fewer, or other steps. For example, method 300 may include generating a report in response to validating the asset data at step 390. Steps may be performed in parallel or in any suitable order. While discussed as specific components completing the steps of method 300, any suitable component may perform any step of method 300. For example, the auditing module may receive the first LiDAR data from a first LiDAR vehicle and receive the second LiDAR data from a second LiDAR vehicle that is different than the first LiDAR vehicle.

FIG. 4 illustrates example output 400 that may be generated by auditing module 120 of FIG. 1. Output 400 of FIG. 4 may be in any form, such as a table, a chart, a list, and the like. In the illustrated embodiment of FIG. 4, output 400 is a chart 410. Chart 410 shows audit results 420 from auditing assets 154 using auditing module 120 of FIG. 1. The auditing process involves comparing assets 154 determined from LiDAR data to assets 154 determined at an earlier time. For example, the auditing process may involve comparing assets 154 within spatial model 156c of FIG. 2, which incorporates LiDAR data 152b, to assets 154 within spatial model 156b of FIG. 2, which incorporates LiDAR data 152a and one or more field indications 158.

Chart 410 includes ten columns labeled 430 through 448. Column 430 shows assets 154 analyzed by auditing module 120 of FIG. 1. Assets 154 represent the following physical objects associated with a railroad environment: clearance point, crossing at grade, milepost sign, signal, speed sign, and switch. Column 432 of table 410 shows the total number of assets 154 analyzed by auditing module 120 of FIG. 1. In the illustrated embodiment of FIG. 4, auditing module 120 analyzed 117 clearance points, 269 crossings, 27 milepost signs, 199 signals, 98 speed signs, and 84 switches, which totals to 974 total assets 154.

Column 434 of table 410 shows passes determined by auditing module 120 of FIG. 1. Passes represent matches between the data within a predetermined tolerance. For example, out of the 117 clearance points analyzed in a first model (e.g., spatial model 156c of FIG. 2), the locations of 117 clearance points matched the locations of 117 clearance points in the second model (e.g., spatial model 156b of FIG. 2) within a predetermined tolerance (e.g., 2.2 meters). Column 436 of table 410 shows exceptions determined by auditing module 120 of FIG. 1. Exceptions represent anomalies between the data. For example, out of the 207 milepost signs analyzed in a first model (e.g., spatial model 156c of FIG. 2), 4 milepost signs were either missing or in a different location in the second model (e.g., spatial model 156b of FIG. 2).

Column 438 of table 410 shows the percentage of assets 154 that passed, which is the pass number of assets 154 shown in column 434 divided by the total number of assets 154 shown in column 432, represented as a percentage. Column 440 shows exceptions found with no change management process (CMP). CMP represents a change that has been indicated to auditing module 120 (e.g., a field indication). Column 442 shows exceptions found with an incorrect CMP. An incorrect CMP represents a CMP that has been implemented incorrectly in the spatial model. For example, the incorrect CMP may represent a milepost sign that was relocated in the spatial model twenty feet, but the CMP indicated that the milepost sign should be relocated in the spatial model ten feet.

Column 444 of table 410 shows CMP found but no geographic information system (GIS) edit, which represents a change that has been indicated to auditing module 120 (e.g., a field indication) but has not yet been implemented in the spatial model. Column 446 of table 410 shows exceptions found due to office error, and column 448 of table 410 shows assets 154 that could not be verified.

Modifications, additions, or omissions may be made to output 400 depicted in FIG. 4. For example, output 400 may be represented in a format other than chart 410 such as a list or a graph. Table 410 may include more, fewer, or other columns and/or rows. For example, table 410 may include more or less than ten columns and 6 assets. In certain embodiments, output 400 may be included in one or more reports (e.g., report 160 of FIG. 1).

FIG. 5 shows an example computer system that may be used by the systems and methods described herein. For example, network 110, auditing module 120, and LiDAR vehicle 170 of FIG. 1 may include one or more interface(s) 510, processing circuitry 520, memory(ies) 530, and/or other suitable element(s). Interface 510 (e.g., interface 122 of FIG. 1) receives input, sends output, processes the input and/or output, and/or performs other suitable operation. Interface 510 may comprise hardware and/or software.

Processing circuitry 520 (e.g., processor 126 of FIG. 1) performs or manages the operations of the component. Processing circuitry 520 may include hardware and/or software. Examples of a processing circuitry include one or more computers, one or more microprocessors, one or more applications, etc. In certain embodiments, processing circuitry 520 executes logic (e.g., instructions) to perform actions (e.g., operations), such as generating output from input. The logic executed by processing circuitry 520 may be encoded in one or more tangible, non-transitory computer readable media (such as memory 530). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 530 (or memory unit) stores information. Memory 530 (e.g., memory 124 of FIG. 1) may comprise one or more non-transitory, tangible, computer-readable, and/or computer-executable storage media. Examples of memory 530 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system for identifying and auditing railroad assets, comprising:
    a memory having a database storing a plurality of railroad data, engines, and models; and
    a processor operably coupled to the memory and capable of executing machine-readable instructions to perform program steps, the program steps including:
        a data collection engine configured to collect sensor data from a sensor disposed on a vehicle to generate a spatial model of a railroad environment;
        a machine learning module configured to automatically identify railroad assets,
        wherein the data collection engine instantiates the machine learning module to extract railroad assets from the sensor data, and
        wherein the machine learning module is configured to compare the identified railroad assets to the database to audit the presence and location of railroad assets within the environment captured by the sensor.

2. The system of claim 1, wherein the sensor data includes one or more of LiDAR data, GPS data, a field indication, or an image.

3. The system of claim 1, wherein the data collection engine is configured to generate the spatial model using LiDAR data, GPS data, one or more field indications, one or more images, one or more LiDAR point clouds.

4. The system of claim 1, wherein the data collection engine is configured to collect one or more field indications from a user device.

5. The system of claim 4, wherein the GIS is configured to analyze spatial locations and organize layers of information into the spatial model using maps, two-dimensional (2D) scenes, or three-dimensional (3D) scenes.

6. The system of claim 1, where in the data collection engine uses a Geographic Information System (GIS) or LiDAR visualization software to generate the spatial model of a railroad environment.

7. The system of claim 1, wherein the 2D scenes include orthographic imagery generated from LiDAR point cloud data.

8. The system of claim 1, wherein the data collection engine is configured to superimpose one or more assets into the spatial model.

9. The system of claim 1, wherein the railroad asset is data extracted from sensor data that represents a physical object.

10. A system for auditing railroad assets, comprising:
    a memory having a database storing a plurality of railroad data, engines, and models; and
    a processor operably coupled to the memory and capable of executing machine-readable instructions to perform program steps, the program steps including:
        a model modification engine configured to modify a spatial model of a railroad environment including a railroad asset, captured by a sensor disposed on a vehicle, in response to one or more field indications, wherein the model modification engine is configured to model the spatial model in response to receiving a field indication that the railroad environment has or will be modified; and
        a comparison engine configured to compare spatial model data from one or more spatial models to determine whether an anomaly exists.

11. The system of claim 10, wherein the field indication indicates that the railroad asset will be or has been moved from a first location to a second location within the railroad environment.

12. The system of claim 10, wherein the field indication indicates that the railroad asset will be or has been removed from the railroad environment.

13. The system of claim 10, wherein the field indication indicates that the railroad asset will be or has been added to the railroad environment.

14. The system of claim 10, wherein the comparison engine is configured to compare data from a first spatial model generated at a time T1 to data within a second spatial model generated at a time T2.

15. The system of claim 14, wherein time T2 is any time after time T1.

16. The system of claim 10, wherein the comparison engine is configured to determine that a location of a first railroad asset within a first spatial model is different than a location of the first railroad asset within a second spatial model.

17. The system of claim 10, wherein the comparison engine is configured to determine that a location of a first railroad asset within a first spatial model is not present within a second spatial model.

18. The system of claim 10, wherein the comparison engine is configured to verify, based on the comparison of two or more spatial models, that the information within the compared two or more spatial models is the same.

* * * * *